(12) United States Patent
Zhao et al.

(10) Patent No.: US 9,182,279 B2
(45) Date of Patent: Nov. 10, 2015

(54) OPTICAL MODULE, ELECTRONIC APPARATUS, AND METHOD OF DRIVING OPTICAL MODULE

(71) Applicant: Seiko Epson Corporation, Tokyo (JP)

(72) Inventors: Danjun Zhao, Fujimi (JP); Tetsuo Tatsuda, Ina (JP); Shinichi Arazaki, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/580,925

(22) Filed: Dec. 23, 2014

(65) Prior Publication Data
US 2015/0185074 A1    Jul. 2, 2015

(30) Foreign Application Priority Data
Dec. 27, 2013   (JP) ................. 2013-270760

(51) Int. Cl.
  *G01J 3/28*   (2006.01)
  *G01J 3/02*   (2006.01)
  *G01J 3/26*   (2006.01)
(52) U.S. Cl.
  CPC ............ *G01J 3/027* (2013.01); *G01J 3/0205* (2013.01); *G01J 3/26* (2013.01); *G01J 3/2823* (2013.01); *G01J 2003/2826* (2013.01)
(58) Field of Classification Search
  CPC ............... G01J 3/10; G01J 3/18; G01J 3/28; G01J 3/2803; G01J 3/2823
  USPC ..................................... 356/300–445
  See application file for complete search history.

(56) References Cited

U.S. PATENT DOCUMENTS 5,255,087 A * 10/1993 Nakamura et al. .......... 348/71
2001/0052977 A1   12/2001 Toyooka

FOREIGN PATENT DOCUMENTS

| JP | 2000-152254 A | 5/2000 |
| JP | 3297737 B2 | 7/2002 |
| JP | 2013-017507 A | 1/2013 |

* cited by examiner

*Primary Examiner* — Abdullahi Nur
(74) *Attorney, Agent, or Firm* — Harness, Dickey & Pierce, P.L.C.

(57) ABSTRACT

An optical module includes a wavelength variable interference filter that selects light of a predetermined wavelength from incident light, and can change the wavelength of emitted light; a global shutter imaging element that accumulates electric charges while being exposed to the emitted light, and outputs a detection signal in response to the accumulated electric charges; an imaging element controller for setting a photodetection period during which the electric charges are accumulated in the imaging element, and a standby period during which the electric charges accumulated in the imaging elements are reset; and a spectroscopic controller for controlling the wavelength change driving of the emitted light. The imaging element controller sets the duration of the standby period to a minimum drive time for changing the wavelength or greater. The spectroscopic controller starts the wavelength change driving at the start of the standby period.

7 Claims, 10 Drawing Sheets

OPTICAL MODULE, ELECTRONIC APPARATUS, AND METHOD OF DRIVING OPTICAL MODULE

BACKGROUND

1. Technical Field

The present invention relates to an optical module, an electronic apparatus, and a method of driving the optical module.

2. Related Art

The related art (for example, JP-A-2013-17507) discloses a spectrometry apparatus as an electronic apparatus including a spectroscopic element that can extract a predetermined wavelength of light from incident light and can change the extracted wavelength, and an imaging element that photodetects the light extracted by the spectroscopic element, and in which the spectrometry apparatus performs a spectroscopic measurement by detecting the amount of light photodetected by the imaging element.

JP-A-2013-17507 discloses a spectroscopic imaging apparatus (spectrometry apparatus) including an imaging element that alternates a light shielding period and a light exposure period; a spectroscopic element that can change an interplanar spacing of facing optical substrates; and an interplanar spacing control unit that controls the interplanar spacing.

The spectroscopic apparatus disclosed in JP-A-2013-17507, the interplanar spacing control unit changes the interplanar spacing of the spectroscopic element to a spacing corresponding to the wavelength of a subsequent measurement target, by using a predetermined light shielding period of the imaging element.

In the apparatus disclosed in JP-A-2013-17507, the interplanar spacing control unit outputs a control signal, and controls the spectroscopic element to end an operation of changing the interplanar spacing at the end of the light shielding period, while taking account of the fact that the spectroscopic element starts and ends the changing operation at delayed timings with respect to an output timing of the control signal.

However, in the apparatus disclosed in JP-A-2013-17507, the predetermined light shielding period is set to be much longer than the changing operation regardless of the time required for the changing operation.

For this reason, a measurement time increases by the time from the start of the light shielding period to the start of the changing operation.

SUMMARY

An advantage of some aspects of the invention is to provide an optical module, an electronic apparatus, and a method of driving the optical module.

An aspect of the invention is directed to an optical module including: a spectroscopic element that selects light of a predetermined wavelength from incident light, and can change the wavelength of the light that is to be emitted as emitted light; an imaging element that is a global shutter type, accumulates electric charges while being exposed to the emitted light, and outputs a detection signal in response to the accumulated electric charges; an imaging element control unit (controller) that sets a photodetection period in which the electric charges are accumulated in the imaging element exposed to the light, and a standby period in which the electric charges accumulated in the imaging elements are reset; and a spectroscopic control unit (controller) that controls the wavelength change driving of the emitted light in the spectroscopic element. The imaging element control unit sets the length of the standby period to a drive time required for changing the wavelength of the emitted light or greater. The spectroscopic control unit starts the wavelength change driving of the spectroscopic element at the start of the standby period.

According to the aspect of the invention, the drive time indicates a time from when the spectroscopic element is driven to when light of a predetermined wavelength is stably (when the amount of variation of the wavelength falls into a range of predetermined threshold values) emitted. For example, when a wavelength variable Fabry-Perot etalon is used as the spectroscopic element, which obtains emitted light of a predetermined wavelength by varying a gap between a pair of reflective films, the drive time is a time from when the variation of the gap between the reflective films starts to when the amount of variation of the gap between the reflective films falls into the range of predetermined threshold values.

According to the aspect of the invention, the imaging element acquires light for one frame in a pair of the photodetection period and the standby period. That is, in the photodetection period set by the imaging element control unit, the imaging element photodetects light emitted from the spectroscopic element. In the standby period, a detection signal is output in response to the electric charges accumulated in the photodetection period, and the wavelength change driving of the spectroscopic element is performed. At this time, the operation of the wavelength change driving of the spectroscopic element is started at the start of the standby period, and the standby time becomes greater than or equal to the drive time required for the wavelength change driving.

Since the spectroscopic element is driven in the standby time, it is possible to prevent a decrease in resolution which is caused by driving the spectroscopic element in the photodetection period without driving the spectroscopic element in the photodetection period. When the standby period starts, the driving of the spectroscopic element is also started. Accordingly, it is possible to prevent an increase in time for one frame without setting the length of the standby period to be unnecessarily long.

In the optical module according to the aspect of the invention, it is preferable that the spectroscopic control unit sequentially switches the wavelength of the light emitted from the spectroscopic element, and the imaging element control unit sets a longest drive time among drive times for the driving of the spectroscopic element as a time of the standby period, in which the amount of changing the wavelength in the wavelength change driving controlled by the spectroscopic control unit is a predetermined amount or less.

According to the aspect of the invention with this configuration, the imaging element control unit sets the longest time among the drive times as a time of the standby period, in which the amount of changing the wavelength is a predetermined amount or less. That is, according to the aspect of the invention with this configuration, the standby time does not include the drive time when the amount of changing a wavelength exceeds the predetermined amount in a case where the wavelength is changed in a plurality of wavelengths. For this reason, it is possible not to set the drive time exceeding the predetermined time to the longest drive time, and it is possible to reduce the time required for one frame.

In the optical module according to the aspect of the invention, it is preferable that the spectroscopic control unit controls the spectroscopic element to perform stepwise driving by which the wavelength of the emitted light is sequentially changed to a plurality of wavelengths between a first wavelength and a second wavelength less than the first wavelength in an increasing direction or a decreasing direction, and the imaging element control unit sets a longest drive time among the drive times for the stepwise driving as a time of the standby period.

According to the aspect of the invention with this configuration, the spectroscopic element is driven in a stepwise manner for the plurality of wavelengths between the wavelength and the second wavelength, and the imaging element control unit sets the longest drive time for the stepwise driving as the length of the standby period. That is, the drive time (also referred to an initialization time) at the returning of the wavelength from the second wavelength to the first wavelength is not set as the longest drive time. Typically, the initialization time is greater than each of the drive times for the stepwise driving. For this reason, it is possible to prevent the standby period from becoming unnecessarily long, and it is possible to reduce the time required for acquiring one frame by not setting the initialization time as the longest drive time.

In the optical module according to the aspect of the invention, it is preferable that the imaging element control unit sets a longest drive time among drive times for the wavelength change driving controlled by the spectroscopic control unit as a time of the standby period.

According to the aspect of the invention with this configuration, the imaging element control unit sets the longest drive time at the change of the wavelength as a time of the standby period. For example, in a state where the light of the shortest wavelength is emitted, and then the light of the longest wavelength is emitted, the drive time for performing the wavelength change driving is set as a time of the standby period. At this time, even when the wavelength of light emitted from the spectroscopic element is changed, it is possible to more reliably prevent a decrease in measurement accuracy without performing the wavelength change driving in the photodetection period.

In the optical module according to the aspect of the invention, it is preferable that the optical module further includes a stabilization detection unit that detects a stabilized timing at which the amount of changing the wavelength of the light emitted from the spectroscopic element falls into a range of predetermined threshold values, and the imaging element control unit preferably controls the imaging element start accumulating the electric charges by photodetecting the emitted light when the stabilized timing is detected by the stabilization detection unit.

According to the aspect of the invention with this configuration, when the spectroscopic element is stabilized, a photodetection operation (a process in which electric charges are accumulated by virtue of the light exposure) is started.

In this configuration, it is possible to end the standby period and start the photodetection operation at the time when light of a stabilized wavelength is emitted from the spectroscopic element. Accordingly, it is possible to optimize the time required for each frame, and further reduce a measurement time. In addition, it is possible to more reliably prevent the imaging element from photodetecting light of wavelengths other than the predetermined wavelength, and it is possible to more reliably prevent a decrease in measurement accuracy.

Another aspect of the invention is directed to an electronic apparatus including: an optical module including a spectroscopic element that selects light of a predetermined wavelength from incident light, and can change the wavelength of the light to be emitted as emitted light, an imaging element that is a global shutter type, accumulates electric charges when being exposed to the emitted light, and outputs a detection signal in response to the accumulated electric charges, an imaging element control unit that sets a photodetection period in which the electric charges are accumulated in the imaging element exposed to the light, and a standby period in which the electric charges accumulated in the imaging elements are reset, and a spectroscopic control unit that controls the wavelength change driving of the emitted light in the spectroscopic element, in which the imaging element control unit sets the length of the standby period to a drive time required for changing the wavelength of the emitted light or greater, and the spectroscopic control unit starts the wavelength change driving of the spectroscopic element at the start of the standby period; and a control unit that controls the optical module.

In the electronic apparatus according to the aspect of the invention, similar to the aspect of the invention relating to the optical module, the operation of the wavelength change driving of the spectroscopic element is started at the start of the standby period, and the standby period becomes greater than or equal to the drive time required for the wavelength change driving.

Since the spectroscopic element is driven in the standby period, it is possible to prevent a decrease in resolution which is caused by driving the spectroscopic element in the photodetection period without driving the spectroscopic element in the photodetection period. When the standby period starts, the driving of the spectroscopic element is also started. Accordingly, it is possible to prevent an increase in time for one frame without setting the length of the standby period to be unnecessarily long.

Still another aspect of the invention is directed to a method of driving an optical module including a spectroscopic element that selects light of a predetermined wavelength from incident light, and can change the wavelength of light to be emitted as emitted light; an imaging element that is a global shutter type, accumulates electric charges when being exposed to the emitted light, and outputs a detection signal in response to the accumulated electric charges, the method including: setting the length of a standby period, in which the electric charges accumulated in a detection period in which the electric charges are accumulated in the imaging element by exposure to light are reset, to a drive time required for changing the wavelength of the emitted light or greater; and controlling the spectroscopic element to start the wavelength change driving of the emitted light at the start of the standby period.

In the method of driving the optical module according to the aspect of the invention, similar to the aspect of the invention relating to the optical module, the operation of the wavelength change driving of the spectroscopic element is started at the start of the standby period, and the standby time becomes greater than or equal to the drive time required for the wavelength change driving. Since the spectroscopic element is driven in the standby period, it is possible to prevent a decrease in resolution which is caused by driving the spectroscopic element in the photodetection period without driving the spectroscopic element in the photodetection period. When the standby period starts, the driving of the spectroscopic element is also started. Accordingly, it is possible to prevent an increase in time for one frame without setting the length of the standby period to be unnecessarily long.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.

Configuration of Spectrometry Apparatus

Figure 1:
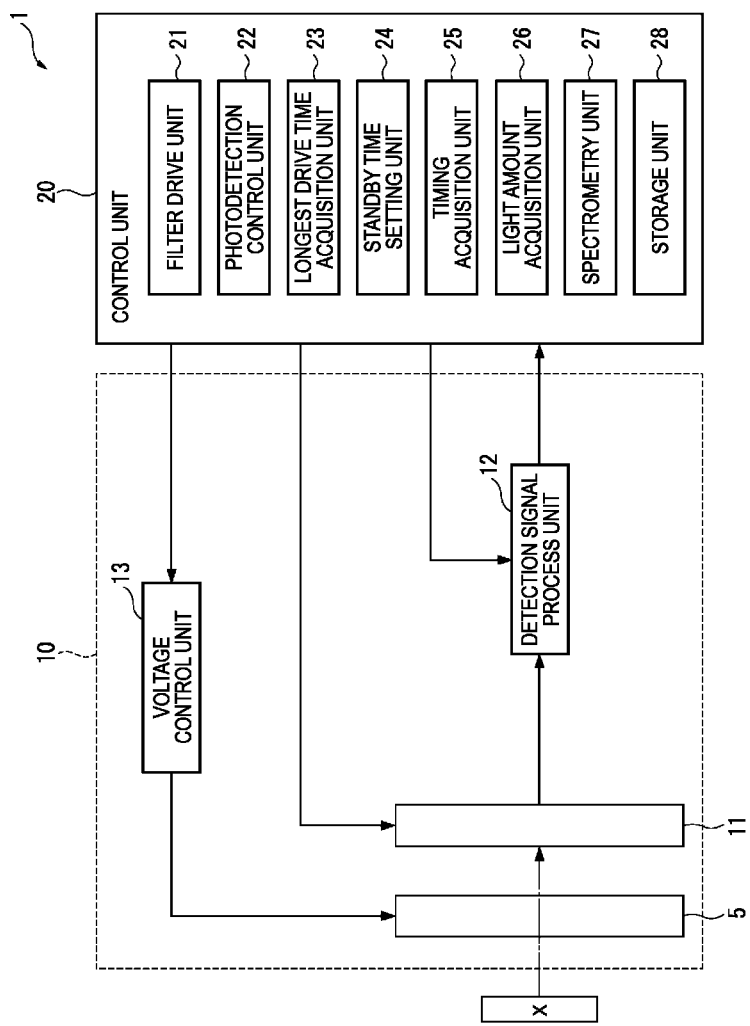
FIG. 1 is a block diagram illustrating the schematic configuration of a spectrometry apparatus according to a first embodiment.

FIG. 1 is a block diagram illustrating the schematic configuration of the spectrometry apparatus according to the first embodiment of the invention.

A spectrometry apparatus 1 is an electronic apparatus, and performs a spectroscopic measurement so as to acquire a predetermined wavelength of the light intensity of measurement target light reflected by a measurement target X. As illustrated in FIG. 1, the spectrometry apparatus 1 includes a spectroscopic module 10 and a control unit 20. The spectroscopic module 10 includes at least a wavelength variable interference filter 5 (a spectroscopic element); an imaging element 11; a detection signal process unit 12; and a voltage control unit 13.

In the spectrometry apparatus 1, the wavelength variable interference filter 5 is driven in response to a command signal from the control unit 20, and the wavelength variable interference filter 5 emits light of a certain wavelength in response to the command signal. In the spectrometry apparatus 1, the imaging element 11 photodetects the light emitted from the wavelength variable interference filter 5, and outputs a detection signal in response to the light intensity of the photodetected light. At this time, in the embodiment, the spectrometry apparatus 1 sets the drive timing for the wavelength variable interference filter 5 and the photodetection timing of the imaging element 11, and drives the wavelength variable interference filter 5 and the imaging element 11 based on the set timings.

In the example of the embodiment, the measurement target light reflected by the measurement target X is measured, however, when a light emitter such as a liquid crystal panel is used as the measurement target X, the measurement target light may be light emitted from the light emitter.

Configuration of Spectroscopic Module

Hereinafter, a configuration of each portion of the spectroscopic module 10 will be described.

Configuration of Wavelength Variable Interference Filter

Figure 2:
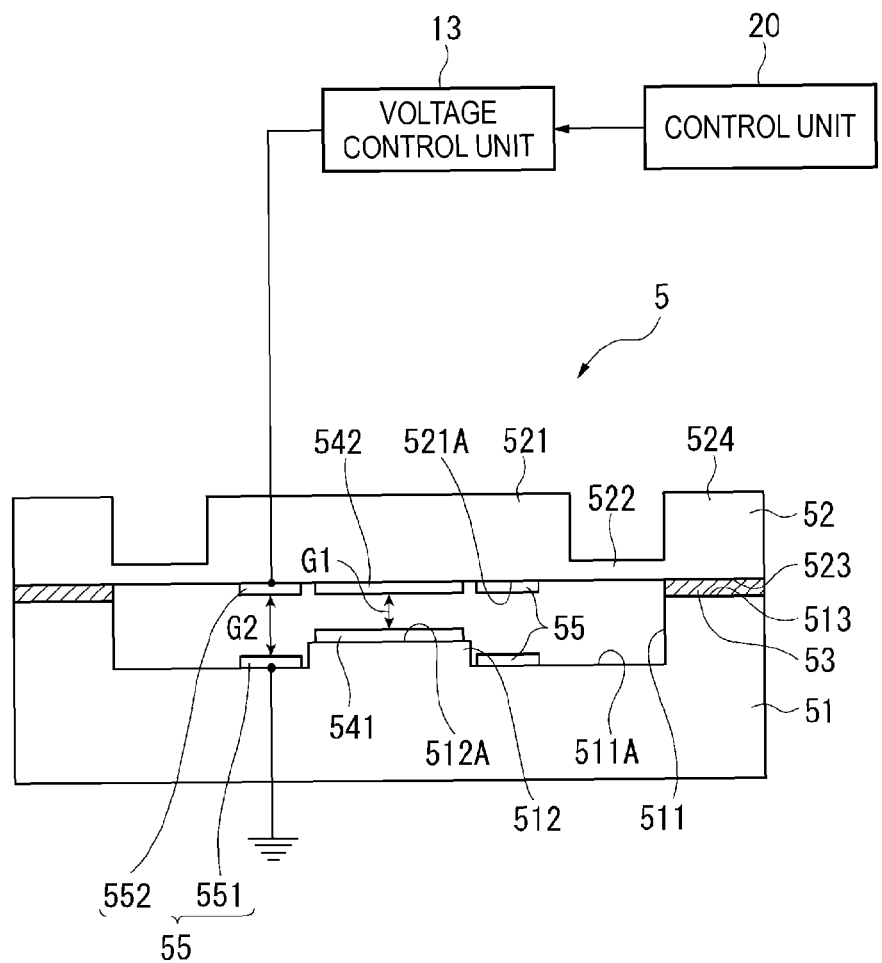
FIG. 2 is a view illustrating the schematic configuration of a wavelength variable interference filter.

For example, the wavelength variable interference filter 5 is a rectangular plate-shaped optical member, and as illustrated in FIG. 2, the wavelength variable interference filter 5 includes a fixed substrate 51; a movable substrate 52; a pair of reflective films 541 and 542; and an electrostatic actuator 55.

The wavelength variable interference filter 5 can control the dimension of a gap G1 between the pair of the reflective films 541 and 542 via the application of a drive voltage to the electrostatic actuator 55 from the voltage control unit 13, and can extract light of a given wavelength in response to the dimension of the gap G1 as interference light.

In the wavelength variable interference filter 5, the fixed substrate 51 and the movable substrate 52 can be made of various types of glass materials, liquid crystal, or the like. A first bonding portion 513 of the fixed substrate 51 and a second bonding portion 523 of the movable substrate 52 are integrally formed by bonding the first bonding portion 513 and the second bonding portion 523 using a bonding film 53 that is formed by a plasma polymerized film having siloxane or the like as a main constituent, for example.

The fixed substrate 51 is provided with the fixed reflective film 541, and the movable substrate 52 is provided with the movable reflective film 542. The fixed reflective film 541 and the movable reflective film 542 are disposed to face each other with the gap G1 interposed therebetween. The size of the gap G1 between the reflective films is equal to the distance between the surface of the fixed reflective film 541 and the surface of the movable reflective film 542.

Configuration of Fixed Substrate

As illustrated in FIG. 2, the fixed substrate 51 includes an electrode disposition groove 511 formed by etching or the like, and a reflective film mounting portion 512.

The electrode disposition groove 511 is provided in the fixed substrate 51, but not in an outer circumferential portion of the fixed substrate 51 in a plan view of the filter. A groove bottom surface of the electrode disposition groove 511 becomes an electrode mounting surface 511A on which an electrode of the electrostatic actuator 55 is disposed.

The electrode mounting surface 511A is provided with a fixed electrode 551 of the electrostatic actuator 55. The fixed electrode 551 is provided on an outer circumference of the reflective film mounting portion 512.

The fixed substrate 51 is provided with an electrode lead-out groove (not illustrated in FIG. 2) that is continuous from the electrode disposition groove 511 toward an outer circumferential portion of the substrate. The fixed electrode 551 includes a connection electrode that is provided in the electrode disposition groove 511 and the electrode lead-out groove and is exposed from the substrate outer circumferential portion to the outside. An exposed portion of the connection electrode is grounded.

The reflective film mounting portion 512 is formed to protrude from a center portion of the electrode disposition groove 511 toward the movable substrate 52. A protruding distal end surface of the reflective film mounting portion 512 becomes a reflective film mounting surface 512A, and the fixed reflective film 541 is mounted on the protruding distal end surface thereof.

The fixed reflective film 541 can be a metal film made of Ag or the like, or a conductive alloy film made of an Ag alloy or the like. For example, the fixed reflective film 541 may be a dielectric multilayer film having a high refractive $TiO_2$ layer and a low refractive $SiO_2$ layer, and in this case, a conductive metal alloy film is preferably formed on the lowermost layer or the surface layer of the dielectric multilayer film.

A reflection preventive film may be formed on a light incident surface (surface that is not provided with the fixed reflective film 541) of the fixed substrate 51, and may be positioned to correspond to the fixed reflective film 541. The reflection preventive film can be formed by alternately laminating the low refractive films and the high refractive films, thereby the reflection preventive film decreases the reflectivity of visible light on the surface of the fixed substrate 51, and increases the transmittance of the visible light.

The electrode disposition groove 511 and the reflective film mounting portion 512 are not formed on a part of the surface of the fixed substrate 51, which faces the movable substrate 52, and the first bonding portion 513 is formed by the part of the surface of the fixed substrate 51. The first bonding portion 513 is bonded to the second bonding portion 523 of the movable substrate 52 via the bonding film 53.

Configuration of Movable Substrate

The movable substrate 52 includes a movable portion 521 of a circular shape or the like which is provided at a center portion of the movable substrate 52; a holding portion 522 that supports the movable portion 521; and a substrate outer circumferential portion 524 that is provided outward of the holding portion 522.

The movable portion 521 has a thickness dimension greater than that of the holding portion 522, and for example, in the embodiment, the movable portion 521 has the same thickness dimension as that of the movable substrate 52. A movable surface 521A of the movable portion 521 faces the fixed substrate 51, and is provided with the movable reflective film 542 and a movable electrode 552.

Similarly to the fixed substrate 51, a reflection preventive film may be formed on a surface of the movable portion 521, which is opposite to the fixed substrate 51.

The movable reflective film 542 is provided in a center portion of the movable surface 521A of the movable portion 521 so as to face the fixed reflective film 541 with the gap G1 interposed between the reflective films. The movable reflective film 542 may be a reflective film with the same configuration as that of the fixed reflective film 541.

The movable surface 521A is provided with the movable electrode 552 of the electrostatic actuator 55. The movable electrode 552 is provided on an outer circumference of the movable reflective film 542.

The movable electrode 552 is disposed to face the fixed electrode 551 with a gap G2 interposed between the electrodes in a plan view seen in a direction of the thickness of the substrate.

The electrostatic actuator 55 includes the fixed electrode 551. The detailed description of the electrostatic actuator 55 will be given later.

The movable electrode 552 includes a connection electrode (not illustrated in FIG. 2) which is disposed from a part of an outer circumferential edge of the movable electrode 552 along a position facing the fixed electrode lead-out groove formed in the fixed substrate 51, and which is exposed from a substrate outer circumferential portion to the outside. An exposed portion of the connection electrode is connected to the voltage control unit 13 via flexible printed circuits (FPC), a lead wire, or the like.

The holding portion 522 is a diaphragm that surrounds the circumference of the movable portion 521, and the holding portion 522 has a thickness dimension less than that of the movable portion 521. The holding portion 522 is bent (flexes) easier than the movable portion 521, and when a small attractive electrostatic force is applied thereto, the movable portion 521 can be displaced toward the fixed substrate 51. In the example of the embodiment, the holding portion 522 has a diaphragm shape, however, the shape of the holding portion 522 is not limited to that shape. For example, beam-shaped holding portions may be provided while being disposed at equiangular intervals about a center point O of the filter.

As described above, the substrate outer circumferential portion 524 is provided outward of the holding portion 522 in the plan view of the filter. A surface of the substrate outer circumferential portion 524, which faces the fixed substrate 51, is provided with the second bonding portion 523 that faces the first bonding portion 513. The second bonding portion 523 is bonded to the first bonding portion 513 via the bonding film 53.

Configuration of Imaging Element, Detection Signal Process Unit, and Voltage Control Unit With reference to FIG. 1, the imaging element 11, the detection signal process unit 12, and the voltage control unit 13 of the spectroscopic module 10 will be described.

The imaging element 11 has a plurality of pixels that are arranged in a two-dimensional planar array. The imaging element 11 is preferably a global shutter type in which the start and end of light exposure are the same for the pixels. The imaging element 11 is one of various image sensors such as a CCD and a CMOS. Each of the pixels of the imaging element 11 has a photodetection unit formed by a photodiode or the like, and accumulates electric charges occurring in response to the amount of light exposure for the photodetection unit. The imaging element 11 outputs a detection signal in response to the accumulated electric charges via the transmission of the accumulated electric charges, and the detection signal is input to the detection signal process unit 12.

Here, in the embodiment, the imaging element 11 has a plurality of pixel rows (for example, n rows of Line 1 to Line n) arranged in one direction. Each of the pixel rows concurrently transmits the accumulated electric charges (outputs a detection signal) of the pixels of the pixel row.

A predetermined time (hereinafter, also referred to as an electric charge transmission time) is required to transmit accumulated charges. For example, the electric charge transmission time is a time on the order of $\mu$ seconds, and is considerably small and negligible compared to a photodetection period (to be described later), a standby period, or a drive time of the wavelength variable interference filter 5.

The detection signal process unit 12 amplifies the input detection signal (analog signal), then converts the input analog signal into a digital signal, and outputs the digital signal to the control unit 20. The detection signal process unit 12 includes an amplifier for amplifying a detection signal, an A/D converter for converting an analog signal into a digital signal, and the like.

The voltage control unit 13 applies a drive voltage to the electrostatic actuator 55 of the wavelength variable interference filter 5 based on a control operation of the control unit 20. Accordingly, an attractive electrostatic force occurs between the fixed electrode 551 and the movable electrode 552 of the electrostatic actuator 55, and the movable portion 521 is displaced toward the fixed substrate 51.

Configuration of Control Unit

Subsequently, the control unit 20 will be described.

The control unit 20 is configured by assembling a CPU, a memory, and the like, and controls the operation of the spectrometry apparatus 1. As illustrated in FIG. 1, the control unit 20 includes a filter drive unit 21; a photodetection control unit 22; a longest drive time acquisition unit 23; a standby time setting unit 24; a timing acquisition unit 25; a light amount acquisition unit 26; a spectrometry unit 27; and a storage unit 28. The storage unit 28 stores V-$\lambda$ data illustrating a relationship between the wavelength of light transmitting through the wavelength variable interference filter 5 and a drive voltage that is applied to the electrostatic actuator 55 corresponding to the wavelength.

The photodetection control unit 22, the longest drive time acquisition unit 23, the standby time setting unit 24, and the timing acquisition unit 25 are an imaging element control unit. The voltage control unit 13 and the filter drive unit 21 are a spectroscopic control unit. That is, the voltage control unit 13, the filter drive unit 21, the photodetection control unit 22, the longest drive time acquisition unit 23, the standby time setting unit 24, and the timing acquisition unit 25 make up the optical module.

The filter drive unit 21 sets the target wavelength of light extracted by the wavelength variable interference filter 5, and outputs a command signal to the voltage control unit 13, as per which a drive voltage corresponding to the set target wavelength is applied to the electrostatic actuator 55 based on the V-λ data.

Figure 3:
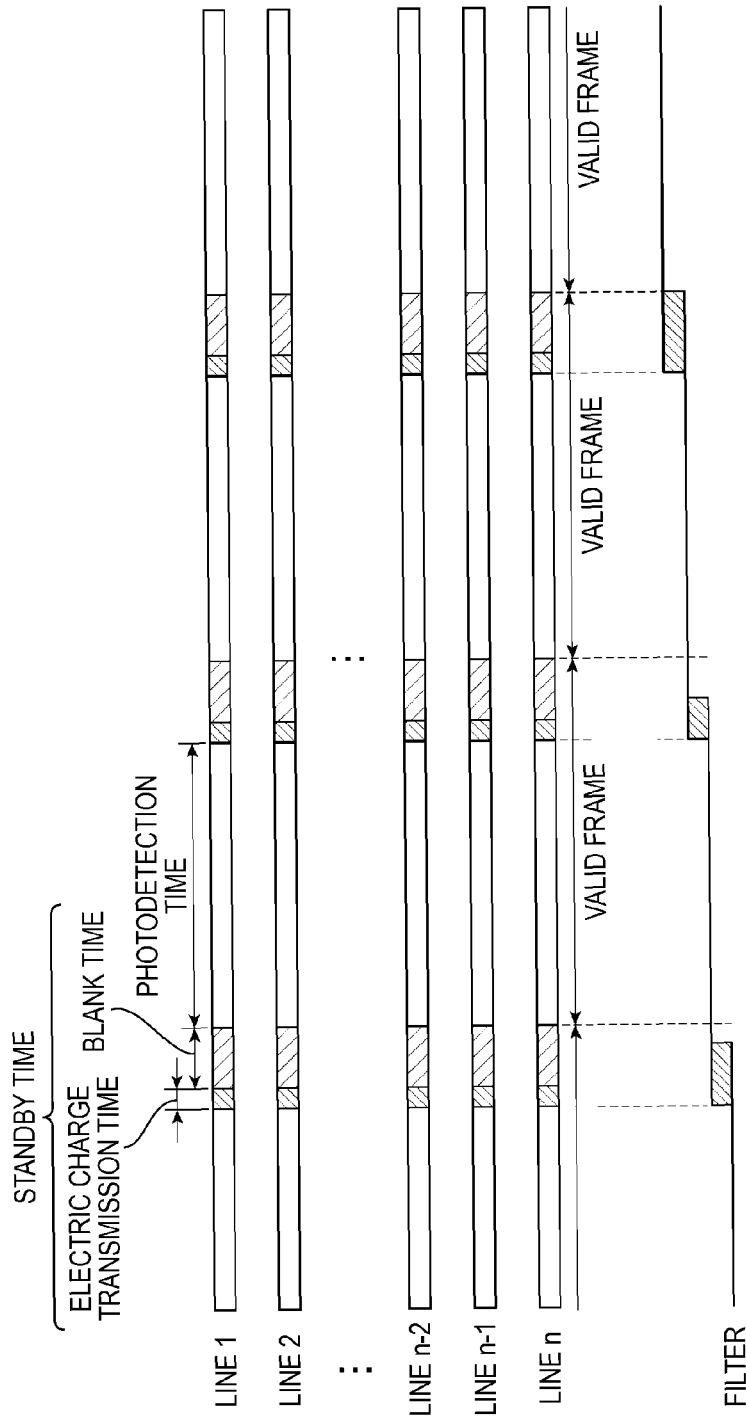
FIG. 3 is a chart illustrating the drive timing of the wavelength variable interference filter and an imaging element.

Here, FIG. 3 is a chart illustrating a drive timing relationship between the wavelength variable interference filter 5 and the imaging element 11.

As illustrated in FIG. 3, the filter drive unit 21 outputs a command signal to the voltage control unit 13 in such a manner that the driving of the wavelength variable interference filter 5 is started in accordance with the start timing of the light exposure for the imaging element 11, which is controlled by the photodetection control unit 22.

The photodetection control unit 22 performs the photodetection process in which the imaging element 11 accumulates electric charges for only a predetermined photodetection time in response to the amount of exposure to measurement light, and the imaging element 11 outputs a detection signal based on the amount of light exposure. In the embodiment, the photodetection control unit 22 controls the imaging element 11 to accumulate electric charges for only a pre-set photodetection time. After the predetermined photodetection time elapses, the photodetection control unit 22 controls the imaging element 11 to end the accumulation of the electric charges, and outputs a detection signal in response to the amount of light exposure by transmitting the accumulated electric charges (transmission of electric charges).

As illustrated in FIG. 3, the photodetection control unit 22 controls the imaging element 11 not to accumulate electric charges for a predetermined standby time from the end of the photodetection time, and after a standby time elapses, the photodetection control unit 22 controls the imaging element 11 to start light exposure for a subsequent frame. As such, the photodetection control unit 22 controls the imaging element 11 to alternate the photodetection period (corresponding to the photodetection time), in which electric charges are accumulated in response to the amount of light exposure, and the standby period (corresponding to the standby time), in which the accumulated electric charges are output and reset and electric charges are not accumulated.

The predetermined time obtained by adding up the photodetection time and the standby time is the time required (desired) for capturing one-frame image and hereinafter, is also referred to as a required frame time. The detailed description of the standby time will be given later.

When the wavelength variable interference filter 5 and the imaging element 11 are continuously capturing images while being synchronized with each other, the longest drive time acquisition unit 23 acquires the longest drive time required for driving the wavelength variable interference filter 5 based on a pre-set measurement pattern.

In the spectrometry apparatus 1, when a spectroscopic measurement is performed, a plurality of measurement target wavelengths and the measurement sequence of the measurement target wavelengths are pre-set as the measurement pattern. The filter drive unit 21 outputs command signals for the measurement target wavelengths to the voltage control unit 13 in sequence, and changes a gap dimension of the wavelength variable interference filter 5 in sequence so that the plurality of measurement target wavelengths are measured based on the measurement pattern.

Here, the drive time required for changing the gap dimension of the wavelength variable interference filter 5 changes in response to the amount of gap variation, a method of varying the gap, or the like. For example, when the amount of gap variation increases, the drive time increases, and in contrast, when the amount of gap variation decreases, the drive time decreases. In addition, for example, the drive time increases when the gap dimension decreases rather than when the gap dimension increases.

For example, in a case where the photodetection process is performed in a stepwise driving mode while changing the gap dimension in order for the gap to be gradually narrowed or widened, or in a case where the gap dimension returns from a gap dimension corresponding to the final wavelength to a gap dimension corresponding to the initial wavelength, the drive time in the latter case becomes longer than that in the former case.

When starting a measurement, a user defines the measurement pattern indicative of measurement target wavelengths and the measurement sequence. Specifically, the spectrometry apparatus 1 may be configured in such a manner that the user can select the measurement pattern from a plurality of measurement patterns which are pre-stored in the storage unit 28, or the user can set the measurement pattern by operating an operation unit (not illustrated).

In a case where the measurement pattern can be selected, the storage unit 28 pre-stores the longest drive times in response to the measurement patterns, and the longest drive time acquisition unit 23 acquires the longest drive time in response to the measurement pattern.

The storage unit 28 pre-stores data indicative of a relationship between the amount of variation of the gap dimension and the drive time, and the like, and the longest drive time acquisition unit 23 acquires the longest drive time using the data and the like.

The standby time setting unit 24 sets the longest drive time acquired by the longest drive time acquisition unit 23 as the standby time. Here, as illustrated in FIG. 3, the standby time includes the electric charge transmission time. Accordingly, the standby time setting unit 24 sets the standby time in such a manner that the longest drive time becomes the sum of the electric charge transmission time and blank times other than the electric charge transmission time.

Here, typically, the drive time is a time on the order of milliseconds, and is long to the extent that the electric charge transmission time (for example, time on the order of μ seconds) is negligible. Accordingly, the standby time setting unit 24 can set the standby time with the electric charge transmission time being constant.

The standby time setting unit 24 may set the standby time to be greater than the longest drive time. At this time, the standby time is preferably set to the longest drive time or greater to less than a predetermined value, and the invention includes such a case. The predetermined value is preferably greater than the allowable tolerance of a drive time estimated in response to the specification of the wavelength variable interference filter 5, the measurement pattern, and the like. Accordingly, it is possible to more reliably start the light exposure in a state in which the wavelength variable interference filter 5 is stabilized.

At this time, the standby time may be set to the sum of the longest drive time and the predetermined value without respect to the electric charge transmission time.

The timing acquisition unit 25 sets the (desired) required frame time based on the standby time set by the standby time setting unit 24 and the pre-set photodetection time. As described in FIG. 3, when the imaging element 11 is continuously driven, the timing acquisition unit 25 acquires the start timing of the photodetection time and the end timing (that is, the start timing of the standby time) of the photodetection time with respect to the start of the driving of the imaging element 11, based on the required frame time. The photodetection period and the standby period in which the amount of light exposure is detected and not detected, respectively, are set in this manner. The filter drive unit 21 drives the wavelength variable interference filter 5 based on the photodetection period and the standby period which are set.

The light amount acquisition unit 26 acquires a detection signal output from the imaging element 11 via the detection signal process unit 12. The light amount acquisition unit 26 acquires the amount of light of a measurement wavelength, which transmits through the wavelength variable interference filter 5, based on the acquired signal.

The spectrometry unit 27 measures the spectral characteristics of the measurement target light based on the amount of light acquired by the light amount acquisition unit 26.

Operation of Spectrometry Apparatus

Subsequently, the operation of the spectrometry apparatus 1 will be described with reference to the drawings.

Figure 4:
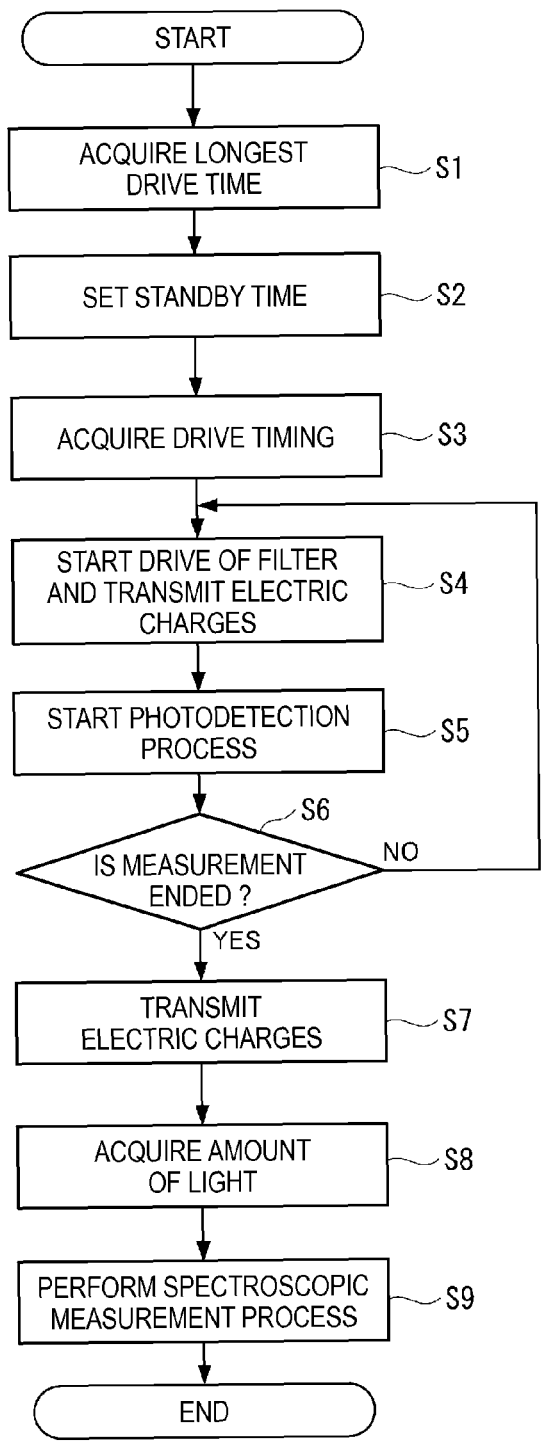
FIG. 4 is a flowchart illustrating an example of the spectrometry process of the spectrometry apparatus.

FIG. 4 is a flowchart illustrating an example of the operation of a spectrometry system.

First, a user operates the spectrometry apparatus 1, and sets a measurement pattern.

When the measurement pattern is set, the longest drive time acquisition unit 23 acquires the longest drive time based on the set measurement pattern (step S1).

Subsequently, the standby time setting unit 24 sets the standby time based on the longest drive time acquired by the longest drive time acquisition unit 23 (step S2).

Subsequently, the timing acquisition unit 25 acquires the drive timing of each of the wavelength variable interference filter 5 and the imaging element 11 (step S3).

The timing acquisition unit 25 sets the required frame time based on the standby time and the photodetection time. When the imaging element 11 is continuously driven, the timing acquisition unit 25 acquires the start timing of the photodetection time and the end timing (that is, the start timing of the standby time) of the photodetection time with respect to the start of the driving of the imaging element 11, based on the required frame time. Accordingly, as illustrated in FIG. 3, the photodetection period and the standby period (drive pattern) of the imaging element 11 are set when the imaging element 11 is continuously driven.

Subsequently, the driving of the wavelength variable interference filter 5 and the imaging element 11 is started. That is, the filter drive unit 21 outputs a command signal to the voltage control unit 13, as per which a drive voltage corresponding to a target wavelength is applied to the electrostatic actuator 55 based on the measurement pattern, and starts the drive of the wavelength variable interference filter 5. Concurrently, the photodetection control unit 22 controls the imaging element 11 to transmit the electric charges and output a detection signal (step S4).

The spectrometry apparatus 1 deletes the electric charges transmitted immediately after the drive is started without referring to the electric charges as detected values.

As described above, since the electric charge transmission time is less than the drive time, as illustrated in FIG. 3, the gap dimension is set to a target value, and the drive time elapses after the end of the transmission of the electric charges by the imaging element 11, and before the end timing of the pre-set standby period.

Subsequently, the photodetection control unit 22 controls the imaging element 11 to perform the photodetection process in accordance with the end timing of the standby period, that is, the start timing of the photodetection period, based the drive pattern set by the timing acquisition unit 25 (step S5).

When the imaging element 11 starts the photodetection process, the drive time of the wavelength variable interference filter 5 elapses (refer to FIG. 3), and the wavelength variable interference filter 5 is set to a gap dimension corresponding to a target wavelength.

Subsequently, the filter drive unit 21 determines whether to end the measurement (step S6). The filter drive unit 21 determines whether it is necessary to change the measurement wavelength to a subsequent measurement wavelength, that is, whether the current measurement is a measurement end before the end of the photodetection period of the imaging element 11. Even when an instruction indicative of the measurement end is received, the measurement is determined to be ended.

For example, the measurement end is determined by whether the measurements of the entirety of the measurement wavelengths are ended, based on the set measurement pattern. The measurement end timing may be also set when the drive timing is set by the timing acquisition unit 25, and the measurement end may be determined when the set measurement end timing is detected.

When the current measurement is determined not to be the measurement end in step S6, the process returns to step S4. Here, when the process returns to step S4, the filter drive unit 21 drives the wavelength variable interference filter 5, and the photodetection control unit 22 controls the imaging element 11 to transmit electric charges and output a detection signal. Here, the output detection signal is a signal corresponding to the amount of light exposure. Accordingly, the light amount acquisition unit 26 acquires the detection signal output from the imaging element 11 via the detection signal process unit 12.

In contrast, when the current measurement is determined to be the measurement end in step S6, the photodetection control unit 22 controls the imaging element 11 to transmit the electric charges and output a detection signal in accordance with the end timing of the photodetection period (step S7). Accordingly, the light amount acquisition unit 26 acquires the detection signal output from the imaging element 11 via the detection signal process unit 12.

Subsequently, the light amount acquisition unit 26 acquires the amount of light of the measurement wavelength, which transmits through the wavelength variable interference filter 5, based on the acquired signal (step S8).

The spectrometry unit 27 measures the spectral characteristics of the measurement target light based on the amount of light acquired by the light amount acquisition unit 26 (step S9).

As such, the spectrometry apparatus 1 acquires the spectral characteristics of the measurement target X based on the set measurement pattern.

FIG. 4 illustrates an example in which a measurement is performed based on a measurement pattern, a detection signal corresponding to the amount of light exposure is acquired, and after the end of the measurement, the amount of light is acquired, and an analysis is performed based on the acquired amount of light. In addition, for example, the spectrometry apparatus 1 may sequentially acquire the amount of light corresponding to measurement wavelengths while acquiring detection signals.

Effects of First Embodiment

In the spectrometry apparatus 1, the imaging element 11 acquires light for one frame in the pair of periods including the photodetection period and the standby period. That is, in the pre-set photodetection period, the imaging element 11 photodetects light emitted from the wavelength variable interference filter 5. In the standby period, a detection signal is output in response to the electric charges accumulated in the photodetection period, and the wavelength change driving of the wavelength variable interference filter 5 is performed. At this time, the wavelength change driving of the wavelength variable interference filter 5 is started at the start of the standby period, and the standby time becomes greater than or equal to the drive time required for the wavelength change driving.

Figure 5:
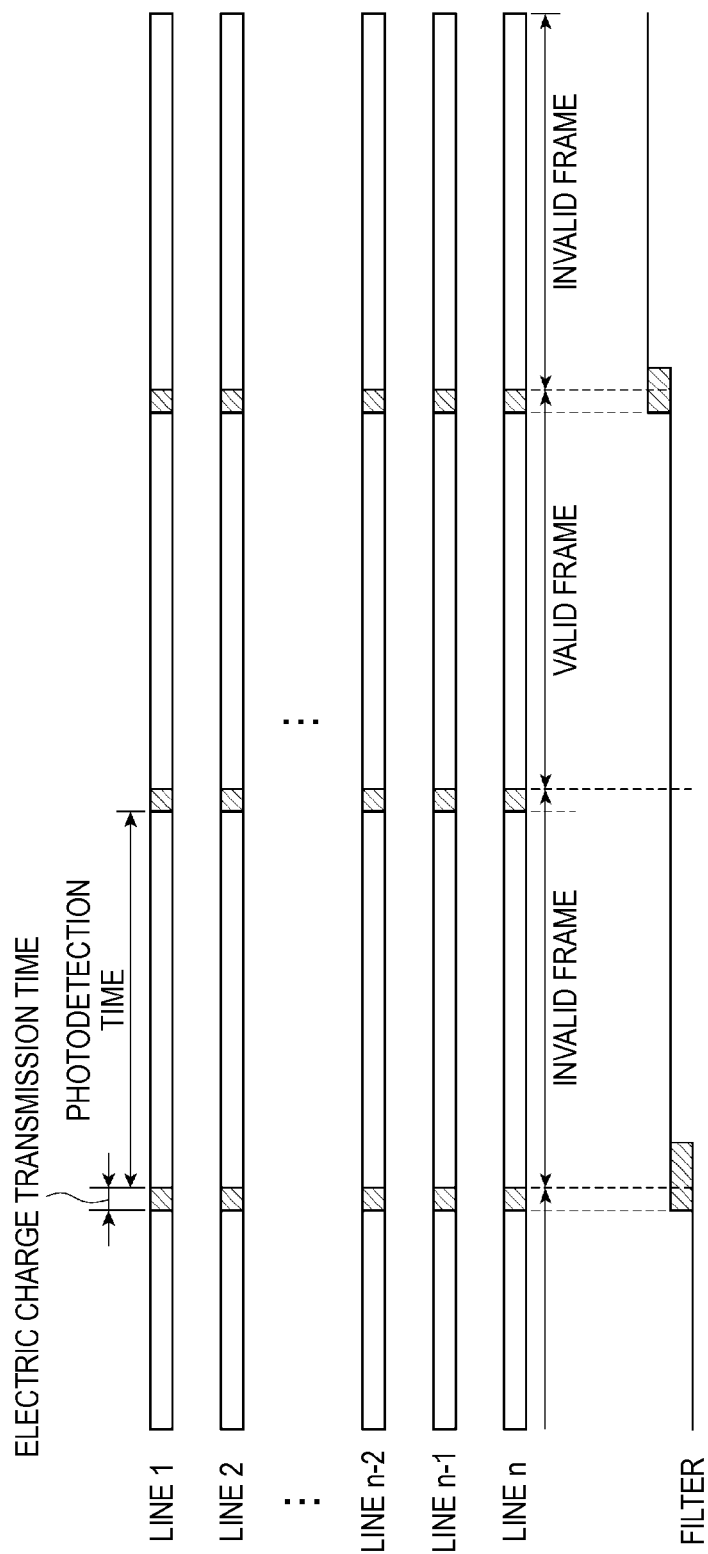
FIG. 5 is a chart illustrating the drive timing of the wavelength variable interference filter and the imaging element in a comparative example.

Here, FIG. 5 is a chart illustrating an example of the drive timing of the wavelength variable interference filter 5 and the imaging element 11 when the standby time does not include the blank time.

Typically, the drive time of the wavelength variable interference filter 5 is greater than the electric charge transmission time of the imaging element 11. For this reason, as illustrated in FIG. 5, when the standby time does not include the blank time, light exposure for a subsequent frame is started before the wavelength of light emitted from the wavelength variable interference filter 5 is changed to a target wavelength in a state where the drive time of the wavelength variable interference filter 5 does not end. For this reason, a measured value includes the amount of light of wavelengths other than the target wavelength. Accordingly, a frame overlapping the drive time of the imaging element 11 becomes an invalid frame, and the measured value is deleted, and thus a subsequent frame becomes a valid frame, the measured value is acquired, so that a decrease in measurement accuracy is prevented. That is, the valid frame and the invalid frame are alternated, and a measurement time increases by a part of a required frame time for the invalid frame, the part of time being a period after the end of the drive time of the wavelength variable interference filter 5.

It is considered that the standby time is sufficiently provided with respect to the drive time of the wavelength variable interference filter 5 so as to prevent the occurrence of the invalid frame as described above. At this time, when the longest conceivable standby time is not provided based on various conditions such as the operation characteristics, for example, the drive time and drive pattern (selection sequence of wavelengths, a gap between the wavelengths when a plurality of wavelengths are selected) of the wavelength variable interference filter 5, invalid frames may occur. In addition, the setting of the standby time greater than an actual drive time for many frames may increase a measurement time.

In contrast, in the spectrometry apparatus 1 of the embodiment, since the wavelength change driving of the wavelength variable interference filter 5 is performed in the standby period, it is possible to prevent a decrease in resolution which is caused by performing the wavelength change driving in the photodetection period. When the standby period starts, the wavelength change driving of the wavelength variable interference filter 5 is also started. Accordingly, it is not necessary to set the standby period to an unnecessary length so as to drive the wavelength variable interference filter 5 in the standby period, and it is possible to prevent a time for one frame from increasing.

More specifically, when the spectrometry apparatus continuously drives the imaging element 11 over a plurality of frames, the spectrometry apparatus 1 sets the longest drive time of the wavelength variable interference filter 5 as the standby time. The spectrometry apparatus 1 acquires a required frame time including the photodetection time and the standby time, and sets the photodetection period and the standby period. The spectrometry apparatus 1 starts the wavelength change driving of the wavelength variable interference filter 5 in accordance with the start of the standby period.

In this configuration, when the wavelength variable interference filter 5 changes a selected wavelength among the plurality of wavelengths, the standby time is set to align with the longest drive time of the wavelength variable interference filter 5 in response to the drive pattern. For this reason, it is possible to acquire the required frame time from the photodetection time and the longest drive time, and it is possible to acquire the end timing of the photodetection period in a case where the imaging element 11 is continuously driven. It is possible to drive the wavelength variable interference filter 5 in the standby period for each frame, and reduce a measurement time by driving the wavelength variable interference filter 5 in accordance with the end timing.

When the drive start timing of the continuous drive of the imaging element 11 is synchronized with the start timing of the drive control of the spectroscopic element, it is possible to synchronize the drive timing of the wavelength variable interference filter 5 with that of the imaging element 11 merely by performing the wavelength change driving of the wavelength variable interference filter 5 at a pre-acquired end timing of the photodetection period, that is, the start of the standby time. Accordingly, it is possible to easily align the drive timing of the wavelength variable interference filter 5 with that of the imaging element 11 without controlling the wavelength variable interference filter 5 and the imaging element 11 while always or periodically synchronizing the drive timing of the wavelength variable interference filter 5 with that of the imaging element 11.

The spectrometry apparatus 1 sets the longest drive time at the change of the wavelength as the standby time. For example, the standby time is set to a drive time (also referred to an initialization time) at the returning of the gap dimension from a gap dimension corresponding to a final wavelength to a gap dimension corresponding to an initial wavelength in the repeated stepwise driving. The initialization time is greater than each of the drive times for the stepwise driving. Accordingly, even when the wavelength of light emitted from the wavelength variable interference filter 5 is changed to any wavelength, it is possible to more reliably prevent a decrease in measurement accuracy by setting the longest drive time to the standby time without performing the wavelength change driving in the photodetection period.

Modification Example of First Embodiment

In the configuration of the first embodiment, the standby time is set to the longest drive time among the entirety of available drive times in the drive pattern. In contrast, in a modification example, the longest drive time is acquired from the drive times for driving the gap in a stepwise manner when the gap dimension (selected wavelength) of the wavelength variable interference filter 5 is increased or decreased repeatedly and sequentially in a stepwise driving mode.

Figure 6:
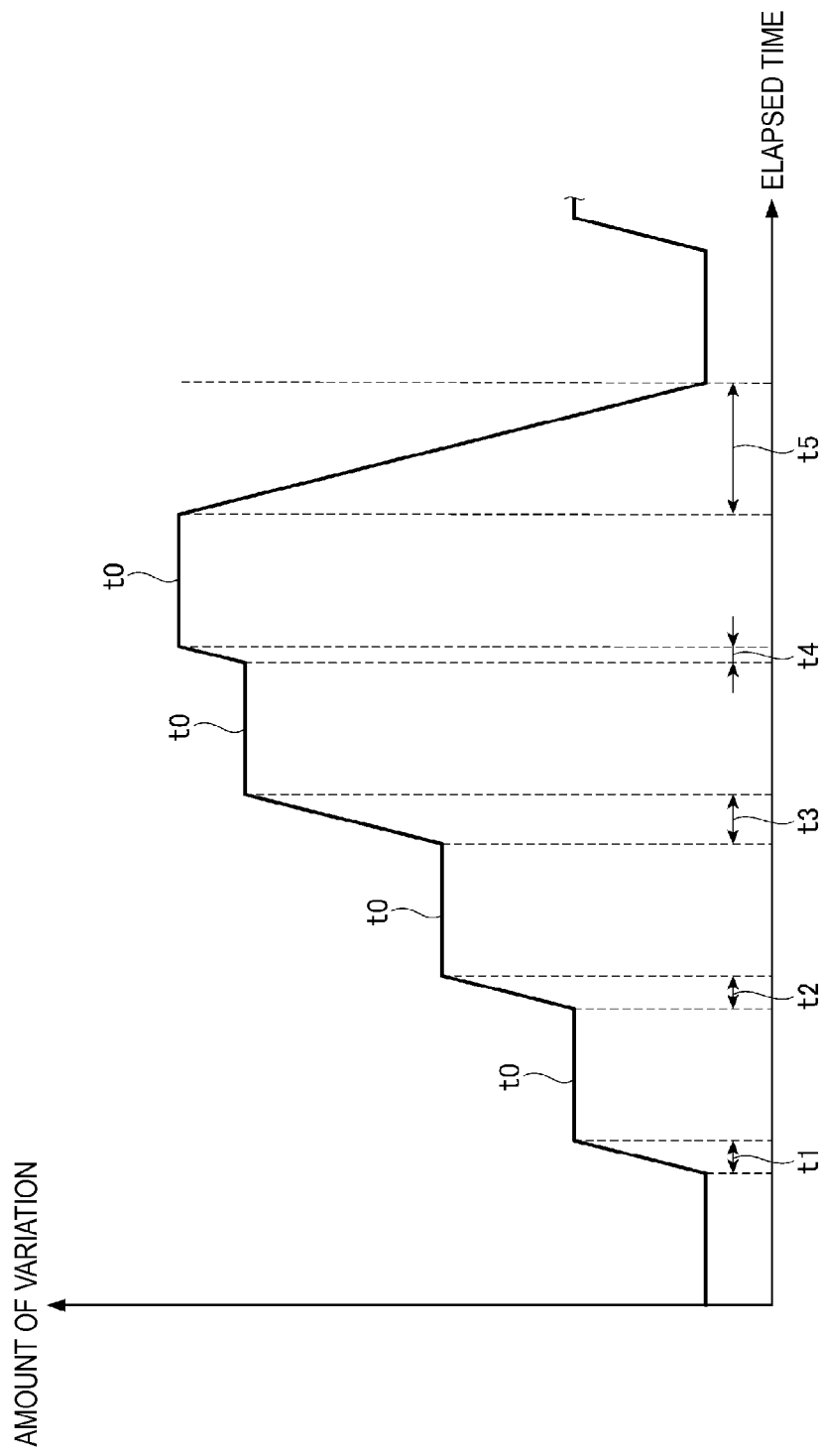
FIG. 6 is a graph illustrating an example of a drive pattern of the wavelength variable interference filter.

FIG. 6 is a graph schematically illustrating a time and the amount of variation in a case where the gap dimension is changed in a stepwise manner (hereinafter, also referred to as stepwise driving) in an increasing direction or a decreasing direction when the gap dimension of the wavelength variable interference filter 5 is set to a plurality of values, and measurements are performed for the values of the gap dimension. FIG. 6 illustrates an example when measurements are performed with the gap dimension set to five different values. The drive time and the amount of variation have a non-linear relationship, however, in FIG. 6, the drive time and the amount of variation have a linear relationship for convenience of description. In FIG. 6, a blank time secured in an actual measurement is omitted, and the photodetection time is set to t0 for a portion in which the gap dimension does not vary.

In a measurement pattern illustrated in FIG. 6, measurements are performed for the five gap dimensions while gradually increasing the amount of variation of an initial gap. In FIG. 6, the drive times for driving the gap four times refer to t1 to t4 in a driving sequence, respectively.

In the example illustrated in FIG. 6, the amount of variation for a third drive among driving the gap four times is the maximum, and the drive time t3 between the drive times t1 to t4 becomes the maximum. When the gap dimension returns from a final gap dimension (the amount of variation is the maximum, and also referred to as a final gap) of the stepwise driving to an initial gap dimension (the amount of variation is the minimum, and also referred to as a first gap), the amount of variation for driving the gap four times is changed all at once. For this reason, the drive time t5 at the returning of the gap dimension from the final gap to the first gap becomes greater than a drive time of t1 to t4.

When a measurement pattern is set to perform the stepwise driving, the longest drive time acquisition unit 23 does not include a drive time at the returning of the gap dimension from the final gap to the first gap in determining the longest drive time, and acquires the longest drive time from the drive times for the stepwise driving.

Specifically, in the embodiment, the drive time t3 is determined to be the longest drive time, which is the longest drive between the drive times t1 to t4 for driving the gap four times. At this time, the drive time 5 at the returning of the gap dimension from the final gap to the first gap is not included in determining the longest drive time.

As such, when the stepwise driving is performed, the spectrometry apparatus 1 does not include the drive time t5 at the returning of the gap dimension from the final gap to the first gap, and includes only the drive times t1 to t4 for the stepwise driving in determining the longest drive time. In FIG. 6, the longest drive time is set to t3, and when the gap dimension returns from the final gap to the first gap, the drive time t5 exceeds the standby time. For this reason, before the gap dimension of the wavelength variable interference filter 5 is set to the first gap, the photodetection starts. Accordingly, it is not possible to make an appropriate measurement with only one frame. Accordingly, the spectrometry apparatus 1 deletes a measurement result of a sixth frame.

That is, in the spectrometry apparatus 1, one frame is assigned to return the gap dimension from the final gap to the first gap among the measurement of (N+1) frames corresponding to driving the gap N times in a stepwise manner, and the stepwise driving in which (N+2) frames are one set is performed. That is, a measured value is acquired for each of consecutive (N+1) frames, and a measurement result of an (N+2)-th frame is deleted.

Here, in the example illustrated in FIG. 6, when the longest drive time is set to t3, it is possible to reduce the standby time by only a time (t5−t3) for each drive compared to when the longest drive time is set to t5. For this reason, a required frame time decreases by only a time (t5−t3)×4 for driving the gap four times in a stepwise manner. When the time (t5−t3)×4 reduced for driving the gap four times is greater than the required frame time, the time required for five measurements becomes less than when the longest drive time is set to t5. That is, when the time (t5−t3)×4 is greater than the required frame time, even though one frame is assigned to return the gap dimension from the final gap to the first gap, it is possible to reduce a required frame time compared to when a measurement is performed by setting the longest drive time to t5 and continuously performing the stepwise driving.

When a value (tr−tk)×N is greater than a required frame time at the setting of a drive time tk to the longest drive time, the longest drive time may be set to tk, and in contrast, when the value (tr−tk)×N is less than the required frame time at the setting of a drive time tk to the longest drive time, the longest drive time may be set to tr. Here, tk is the longest drive time for the stepwise driving, tr is the drive time for driving the gap to return from the final gap to the first gap, and N is the number of step driving.

The longest drive time acquisition unit 23 may set any one of the drive times as the longest drive time, in which the amount of changing the wavelength is a predetermined amount or less. That is, when a wavelength is changed in a plurality of wavelengths, the longest drive time acquisition unit 23 may be configured to acquire the longest drive time not from drive times when the amount of changing the wavelength exceeds the predetermined amount, but from drive times within a predetermined time, which correspond to a predetermined amount of changing the wavelength or less. At this time, it is possible to not set the drive time exceeding the predetermined time to the longest drive time, and it is possible to reduce the time required for one frame.

Here, for example, the predetermined amount of changing the wavelength is a maximum value of the amount of changing the measurement wavelength. The maximum value for the amount of change may be acquired from the drive pattern when the stepwise driving is performed, or may be pre-set for the entirety of the drive patterns.

Second Embodiment

Hereinafter, a second embodiment of the invention will be described with reference to the accompanying drawings.

In the first embodiment, the spectrometry apparatus 1 acquires a required frame time by setting the standby time to the longest drive time, and continuously drives the imaging element in the required frame time. In the second embodiment, after the wavelength variable interference filter 5 is driven, the stabilization of the gap dimension corresponding to a target wavelength is detected, and then the light exposure for the imaging element is started at the detected timing.

The second embodiment has the same configuration as in the first embodiment except for a point that a spectrometry apparatus is configured to detect the stabilization of the wavelength variable interference filter 5 instead of being configured to acquire the longest drive time in the first embodiment. In the following description, the same reference signs will be assigned to the same configurations as in the first embodiment, and the description thereof will be omitted or simplified.

Configuration of Spectrometry Apparatus

Figure 7:
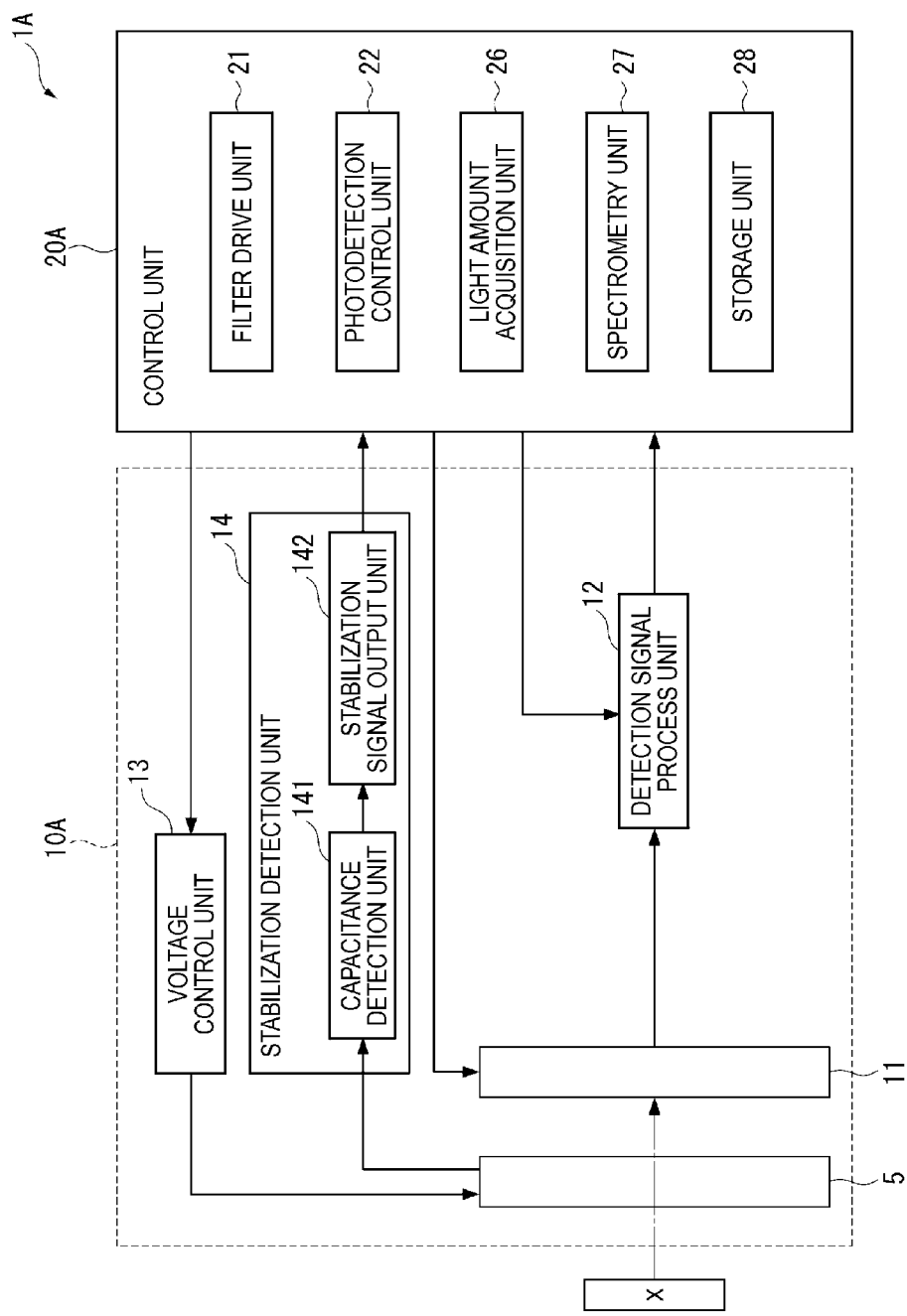
FIG. 7 is a block diagram illustrating the schematic configuration of a spectrometry apparatus of a second embodiment.

FIG. 7 is a block diagram illustrating the schematic configuration of the spectrometry apparatus of the second embodiment.

Figure 8:
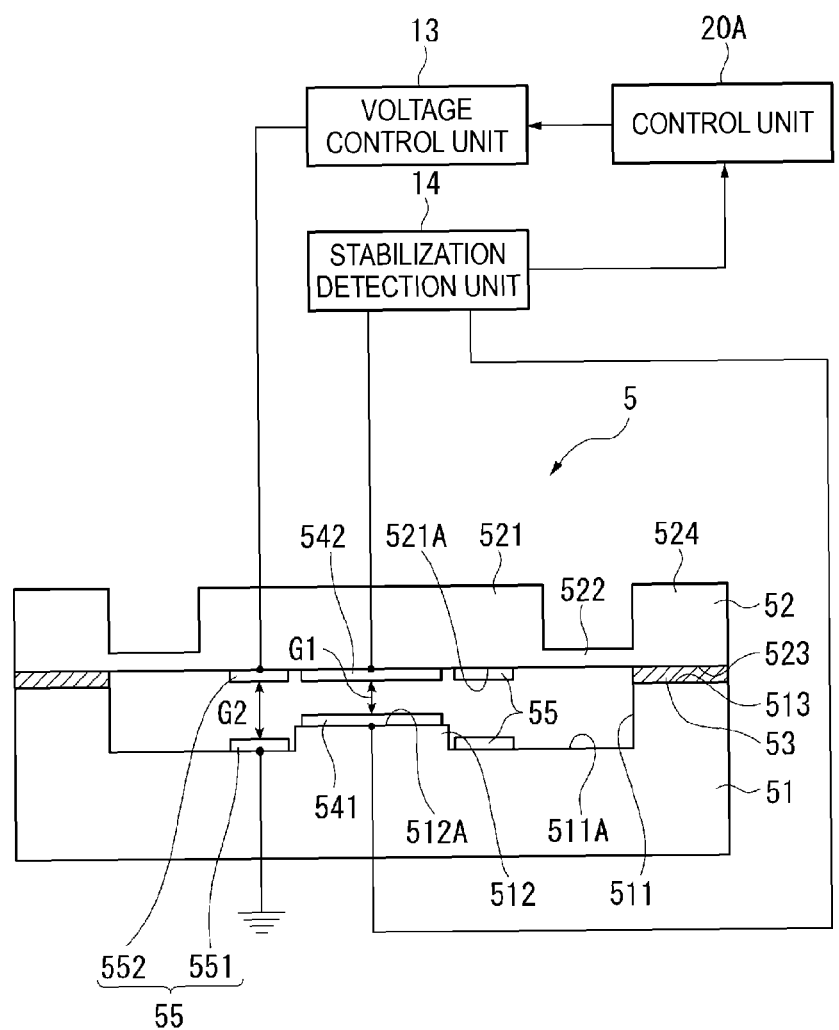
FIG. 8 is a view illustrating the schematic configuration of the wavelength variable interference filter.

FIG. 8 is a cross-sectional view illustrating the schematic configuration of the wavelength variable interference filter 5 of the second embodiment.

As illustrated in FIG. 7, a spectrometry apparatus 1A includes a spectroscopic module 10A and a control unit 20A.

Configuration of Spectroscopic Module

The spectroscopic module 10A includes at least the wavelength variable interference filter 5; the imaging element 11; the detection signal process unit 12; the voltage control unit 13; and a stabilization detection unit 14.

The stabilization detection unit 14 detects that the variation of the gap dimension of the wavelength variable interference filter 5 is settled, and the gap dimension is set to a set value. The stabilization detection unit 14 includes a capacitance detection unit 141 and a stabilization signal output unit 142.

As illustrated in FIG. 8, the capacitance detection unit 141 is connected to the reflective films 541 and 542. The capacitance detection unit 141 detects an electrostatic capacitance in response to the dimension of the gap G1 between the reflective films 541 and 542. The capacitance detection unit 141 includes a capacitance to voltage converter (C/V converter) and the like, and outputs a detection signal corresponding to the detected electrostatic capacitance.

When the electrostatic capacitance becomes a predetermined value, and the gap dimension is set to a set value, the stabilization signal output unit 142 detects the stabilization of the gap dimension, and outputs a stabilization signal based on the detection signal from the capacitance detection unit 141.

Figure 9:
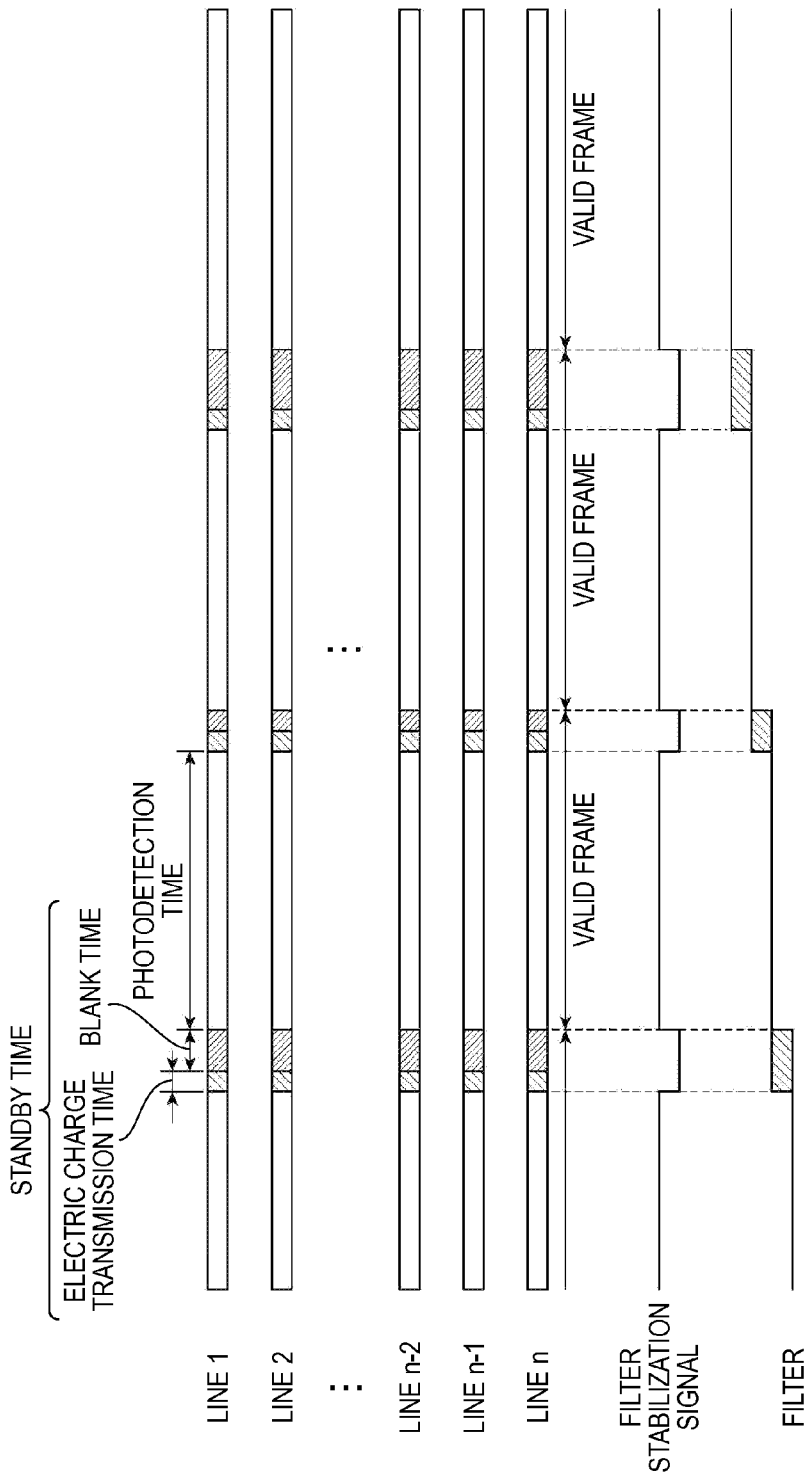
FIG. 9 is a chart illustrating the drive timing of the wavelength variable interference filter and the imaging element.

FIG. 9 is a chart illustrating a drive timing relationship between the wavelength variable interference filter 5 and the imaging element 11.

For example, as illustrated in FIG. 9, the stabilization signal output unit 142 outputs a Low signal when the gap dimension of the wavelength variable interference filter 5 is not stabilized at the set value, and a High signal when the gap dimension is stabilized at the set value.

Configuration of Control Unit

The control unit 20A includes the filter drive unit 21; the photodetection control unit 22; the light amount acquisition unit 26; the spectrometry unit 27; and the storage unit 28.

When the photodetection control unit 22 receives a stabilizing signal (High) indicative of the stabilization signal from the stabilization detection unit 14, the photodetection control unit 22 starts the photodetection process of the imaging element 11.

The imaging element control unit includes at least the stabilization detection unit 14, and further includes the photodetection control unit 22.

Operation of Spectrometry Apparatus

Subsequently, the operation of the spectrometry apparatus 1A will be described with reference to the accompany drawings.

Figure 10:
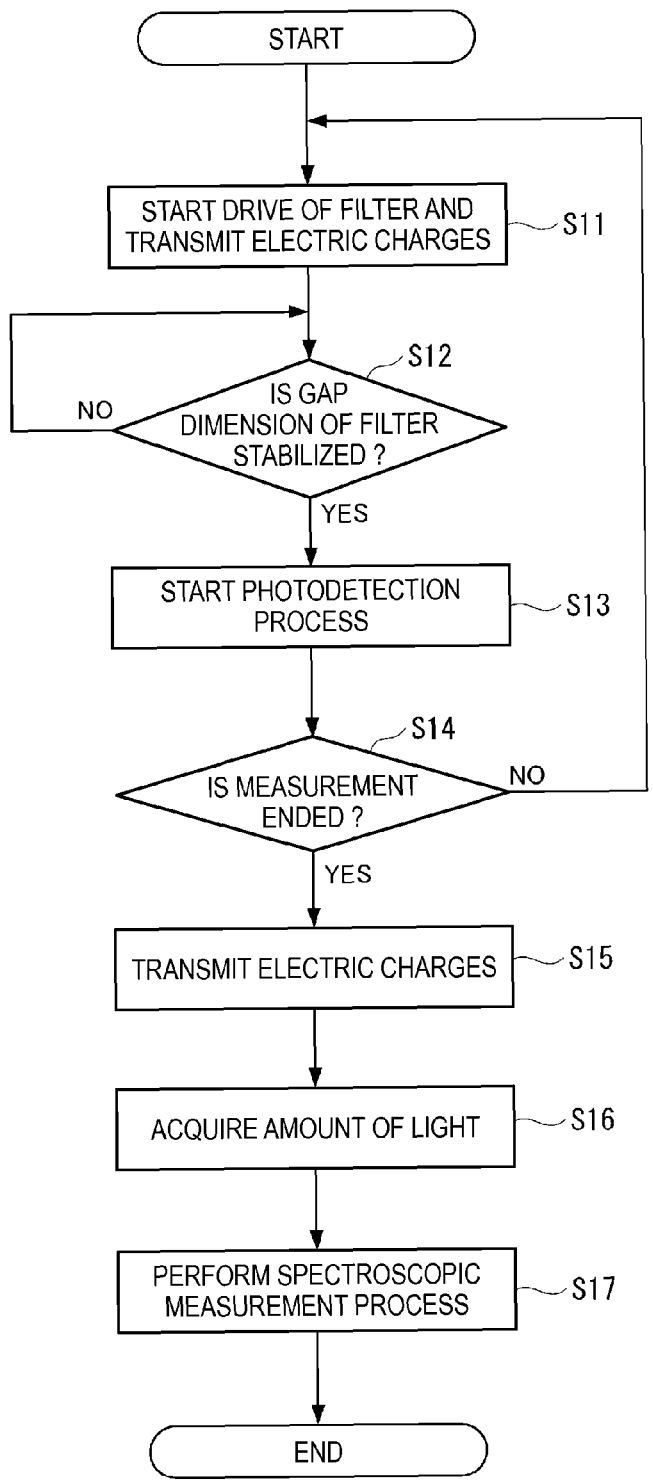
FIG. 10 is a flowchart illustrating an example of the spectrometry process of the spectrometry apparatus.

FIG. 10 is a flowchart illustrating an example of the operation of the spectrometry system.

First, similar to the first embodiment, a user operates the spectrometry apparatus 1A, and sets a measurement pattern.

When the measurement pattern is set, the filter drive unit 21 outputs a command signal to the voltage control unit 13, as per which a drive voltage corresponding to a target wavelength is applied to the electrostatic actuator 55 based on the measurement pattern, and starts the drive of the wavelength variable interference filter 5. Concurrently, the photodetection control unit 22 controls the imaging element 11 to transmit electric charges and output a detection signal (step S11). Similar to the first embodiment, the spectrometry apparatus 1A deletes electric charges transmitted immediately after the drive of the wavelength variable interference filter 5 is started without referring to the electric charges as detected values.

Subsequently, the stabilization detection unit 14 detects that the gap dimension of the wavelength variable interference filter 5 is stabilized at the set value (step S12).

When the drive of the wavelength variable interference filter 5 is started, and the gap dimension of the wavelength variable interference filter 5 becomes the set value, and is stabilized, the state of the stabilizing signal output from the stabilization signal output unit 142 is changed from Low to High. In this manner, the stabilization detection unit 14 outputs a High stabilizing signal indicative of detecting the stabilization.

When the photodetection control unit 22 receives a High stabilizing signal indicative of detecting the stabilization from the stabilization detection unit 14, the photodetection control unit 22 controls the imaging element 11 to start the photodetection process (step S13). While a Low stabilizing signal indicative of not detecting the stabilization is received, the photodetection control unit 22 continues the standby period in which the photodetection process is not performed.

Subsequently, similar to step S6 in the first embodiment, the filter drive unit 21 determines whether the current measurement is a measurement end before the photodetection time of the imaging element 11 ends (step S14).

When the current measurement is determined not to be the measurement end in step S14, the process returns to step S11 when the predetermined photodetection time elapses. When the process returns to step S11, the filter drive unit 21 drives the wavelength variable interference filter 5, and the photodetection control unit 22 controls the imaging element 11 to transmits the electric charges and output a detection signal. Here, the output detection signal is a signal corresponding to the amount of light exposure. Accordingly, the light amount acquisition unit 26 acquires the detection signal output from the imaging element 11 via the detection signal process unit 12.

In contrast, when the current measurement is determined to be the measurement end in step S14, the photodetection control unit 22 controls the imaging element 11 to transmit the electric charges and output a detection signal in accordance with the end timing of the photodetection time (step S15). The light amount acquisition unit 26 acquires the detection signal output from the imaging element 11 via the detection signal process unit 12.

Hereinafter, similar to the first embodiment, the light amount acquisition unit 26 acquires the amount of light of the measurement wavelength, which transmits through the wavelength variable interference filter 5, based on the acquired detection signal (step S16).

The spectrometry unit 27 measures the spectral characteristics of the measurement target light based on the amount of light acquired by the light amount acquisition unit 26 (step S17).

As such, the spectrometry apparatus 1 acquires the spectral characteristics of the measurement target X based on the set measurement pattern.

Effects of Second Embodiment

In the spectrometry apparatus 1A, the photodetection process of the imaging element 11 starts at a time when the stabilization of the wavelength variable interference filter 5 is detected. Accordingly, it is possible to end the standby period and start the photodetection period at a time when the gap dimension of the wavelength variable interference filter 5 is stabilized, that is, when the spectroscopic element outputs light of a stabilized wavelength. Accordingly, it is possible to precisely select the time required for each frame, and reduce the required time.

It is possible to start exposing the imaging element 11 to light at a time when the wavelength variable interference filter 5 is stabilized, and light of a predetermined wavelength can be emitted. Accordingly, it is possible to more reliably prevent the imaging element 11 from photodetecting light of wavelengths other than the predetermined wavelength, and it is possible to more reliably prevent a decrease in measurement accuracy.

Modification of Embodiment

The invention is not limited to the embodiments and the modification example, and includes modifications and improvements insofar as an advantage of some aspects of the invention can be realized.

In the embodiments, the spectrometry apparatus 1 and the spectrometry apparatus 1A are exemplified, however, the invention can be applied to an analysis apparatus that analyzes the constituents of a measurement target.

In the respective configurations of the embodiments, the spectrometry apparatus 1 and the spectrometry apparatus 1A acquire a spectroscopic spectrum based on measurement results, however, the invention is not limited to the configurations in the embodiments, and the invention can be applied to are exemplified, however, the invention can be applied to a spectroscopic camera or the like, by which a spectroscopic image is acquired. That is, a detection signal may be selected for each pixel of each wavelength, and the spectroscopic image of each wavelength may be acquired based on the detection signal of the selected each pixel. A colorimetry process may be performed based on the acquired spectroscopic image. Even with this configuration, since a detection signal for each pixel is selected to correspond to the amount of light exposure in a suitable range of light exposure, it is possible to acquire a high-precision spectroscopic image, and perform a high-precision colorimetry process.

In the embodiments, the wavelength variable interference filter 5 may be built into each of the spectroscopic modules 10 and 10A in a state where the wavelength variable interference filter 5 is accommodated in a package. In this case, it is possible to improve drive responsiveness when a voltage is applied to the electrostatic actuator 55 of the wavelength variable interference filter 5 by vacuum-sealing the package.

In the respective configurations of the embodiments, the wavelength variable interference filter 5 includes the electrostatic actuator 55 that varies the gap dimension between reflective films 541 and 542 when a voltage is applied thereto, however, the invention is not limited to the configurations.

For example, a dielectric actuator may be used in which a first dielectric coil is disposed instead of the fixed electrode 551, and a second dielectric coil or a permanent magnet is disposed instead of the movable electrode 552.

In addition, a piezoelectric actuator may be used instead of the electrostatic actuator 55. In this case, it is possible to expand and contract a piezoelectric film, and bend the holding portion 522 by disposing a lower electrode layer, the piezoelectric film, and an upper electrode layer in the holding portion 522 in a laminated manner, and being able to change a voltage applied between the lower electrode layer and the upper electrode layer as an input value.

In the wavelength variable interference filter 5 of the embodiments, the fixed substrate 51 and the movable substrate 52 as Fabry-Perot etalons are bonded together while facing each other, and the fixed reflective film 541 is provided on the fixed substrate 51, and the movable reflective film 542 is provided on the movable substrate 52, however, the invention is not limited to the configuration.

For example, the fixed substrate 51 and the movable substrate 52 may not be bonded together, and a gap changing portion for changing a gap between the reflective films such as a piezoelectric element may be provided between the substrate.

The invention is not limited to the configuration that includes two substrates. For example, a wavelength variable interference filter may be used, which is formed by laminating two reflective films on one substrate with a sacrifice layer interposed between the reflective films, and removing the sacrifice layer via etching or the like.

In the embodiments, the wavelength variable interference filter 5 is exemplified as the spectroscopic element, however, the invention is not limited to the wavelength variable interference filter 5, and for example, an acousto optic tunable filter (AOTF) or a liquid crystal tunable filter (LCTF) may be used as the spectroscopic element. As in the embodiments, a Fabry-Perot filter is preferably used from the perspective of reducing the size of the apparatus.

In addition, the specific embodied structure of the invention may be formed by appropriately assembling together the embodiments and the modification example insofar as an advantage of some aspect of the invention can be realized, and may be appropriately changed to other structures.

The entire disclosure of Japanese Patent Application No. 2013-270760 filed on Dec. 27, 2013 is expressly incorporated by reference herein.

What is claimed is:

1. An optical module comprising:
   a spectroscopic element that selects light of a predetermined wavelength from incident light, and emits the selected light as emitted light, the spectroscopic element being operable to emit light having one of a plurality of wavelengths;
   a global shutter imaging element that accumulates electric charges while being exposed to the emitted light, and outputs a detection signal in response to the accumulated electric charges;
   an imaging element controller that sets:
      a photodetection period during which the electric charges are accumulated in the imaging element exposed to the light, and
      a standby period during which the electric charges accumulated in the imaging elements are reset; and
   a spectroscopic controller that controls the wavelength change driving of the emitted light in the spectroscopic element,
   wherein the imaging element controller sets a duration of the standby period equal to or greater than a minimum drive time for changing the wavelength of the emitted light, and
   wherein the spectroscopic controller starts the wavelength change driving of the spectroscopic element at a start of the standby period.

2. The optical module according to claim 1,
   wherein the spectroscopic controller sequentially switches the wavelength of the light emitted from the spectroscopic element, and
   wherein the imaging element controller sets a longest drive time among available drive times for the driving of the spectroscopic element as the duration of the standby period, during which an amount of changing of the wavelength in the wavelength change driving controlled by the spectroscopic controller is a predetermined amount or less.

3. The optical module according to claim 1,
   wherein the spectroscopic controller controls the spectroscopic element to perform stepwise driving by which the wavelength of the emitted light is sequentially changed to each of a plurality of wavelengths between a first wavelength and a second wavelength in an increasing direction or a decreasing direction, the second wavelength being shorter than the first wavelength, and wherein the imaging element controller sets a longest drive time among available drive times for the stepwise driving as the duration of the standby period.

4. The optical module according to claim 1, wherein the imaging element controller sets a longest drive time among available drive times for the wavelength change driving controlled by the spectroscopic control unit as the duration of the standby period.

5. The optical module according to claim 1, further comprising:
a stabilization detector that detects a stabilized state at which time the amount of changing of the wavelength of the light emitted from the spectroscopic element falls into a range of predetermined threshold values,
wherein the imaging element controller controls the imaging element to start accumulating the electric charges by photodetecting the emitted light when the stabilized state is detected by the stabilization detector.

6. An electronic apparatus comprising:
an optical module including:
a spectroscopic element that selects light of a predetermined wavelength from incident light, and emits the selected light as emitted light, the spectroscopic element being operable to emit light having one of a plurality of wavelengths,
a global shutter imaging element that:
accumulates electric charges while being exposed to the emitted light, and
outputs a detection signal in response to the accumulated electric charges,
an imaging element controller that sets:
a photodetection period during which the electric charges are accumulated in the imaging element exposed to the light, and
a standby period during which the electric charges accumulated in the imaging elements are reset, and
a spectroscopic controller that controls the wavelength change driving of the emitted light in the spectroscopic element in which the imaging element controller sets the duration of the standby period equal to or greater than a minimum drive time for changing the wavelength of the emitted light, and the spectroscopic controller starts the wavelength change driving of the spectroscopic element at a start of the standby period; and
a controller that controls the optical module.

7. A method of driving an optical module including a spectroscopic element that selects light of a predetermined wavelength from incident light, and emits the selected light as emitted light, the spectroscopic element being operable to emit light having one of a plurality of wavelengths;
a global shutter imaging element that:
accumulates electric charges while being exposed to the emitted light, and
outputs a detection signal in response to the accumulated electric charges, the method comprising:
setting a duration of a standby period during which the electric charges accumulated in a detection period in which the electric charges are accumulated in the imaging element by exposure to light are reset, equal to or greater than a minimum drive time for changing the wavelength of the emitted light; and
controlling the spectroscopic element to start the wavelength change driving of the emitted light at a start of the standby period.

* * * * *